(12) United States Patent
Steele et al.

(10) Patent No.: US 9,415,485 B2
(45) Date of Patent: Aug. 16, 2016

(54) PLIERS HAVING A SLIDING LOCK BUTTON

(71) Applicant: Milwaukee Electric Tool Corporation, Brookfield, WI (US)

(72) Inventors: Michael S. Steele, Waukesha, WI (US); Wade Burch, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 462 days.

(21) Appl. No.: 14/074,780

(22) Filed: Nov. 8, 2013

(65) Prior Publication Data

US 2014/0060264 A1 Mar. 6, 2014

Related U.S. Application Data

(63) Continuation-in-part of application No. 13/005,342, filed on Jan. 12, 2011, now Pat. No. 8,667,874.

(60) Provisional application No. 61/294,290, filed on Jan. 12, 2010, provisional application No. 61/724,554, filed on Nov. 9, 2012.

(51) Int. Cl.
*B25B 7/14* (2006.01)
*B25B 7/02* (2006.01)
*H02G 1/12* (2006.01)

(52) U.S. Cl.
CPC ... *B25B 7/14* (2013.01); *B25B 7/02* (2013.01); *H02G 1/1209* (2013.01)

(58) Field of Classification Search
CPC .............. B25B 7/14; B25B 7/02; B25B 7/04; H02G 1/1209
See application file for complete search history.

(56) References Cited

U.S. PATENT DOCUMENTS 776,879 A 12/1904 Wolfe
1,388,398 A 8/1921 Adams
(Continued)

FOREIGN PATENT DOCUMENTS

CN 2197172 5/1995
CN 1661875 8/2005
(Continued)

OTHER PUBLICATIONS

European Extended Search Report for Application No. 11733302.1 dated May 20, 2014 (4 pages).
(Continued)

*Primary Examiner* — Robert Scruggs
(74) *Attorney, Agent, or Firm* — Michael Best & Friedrich LLP (57) ABSTRACT

A hand tool, pliers and a lock button assembly for a hand tool. The hand tool includes a first jaw assembly including a first rail, a second jaw assembly including a second rail shorter than the first rail, a pivot member coupling the jaw assemblies for pivoting movement between an open position and a closed position. The lock button assembly includes a first lock button member defining a second rail groove operable to selectively receive the second rail; and a second lock button member separate from and connectable to the first lock button member, the lock button members, when connected, cooperating to define a first rail groove receiving the first rail. The lock button assembly is operable between a locked position, engaging the first and second rails to releasably hold the jaw assemblies in the closed position, and an unlocked position, in which the second rail is disengaged.

20 Claims, 6 Drawing Sheets

(56) References Cited

U.S. PATENT DOCUMENTS

| | | |
|---|---|---|
| 2,594,363 A | 4/1952 | Stephenson |
| 2,668,464 A | 2/1954 | Paules |
| 2,674,796 A | 4/1954 | Herold |
| 2,742,698 A | 4/1956 | McGary et al. |
| 2,990,735 A | 7/1961 | Manning |
| 3,044,081 A | 7/1962 | Robinson, Jr. |
| 3,092,152 A | 6/1963 | Neff |
| 3,339,281 A | 9/1967 | Chow |
| 3,416,226 A | 12/1968 | Pfaffenback |
| 3,831,207 A | 8/1974 | Boyajian |
| 3,947,905 A | 4/1976 | Neff |
| 4,104,752 A | 8/1978 | Amrein et al. |
| 4,337,542 A | 7/1982 | Theiler, Sr. |
| D327,826 S | 7/1992 | Neff |
| 5,179,783 A | 1/1993 | Melter |
| 5,263,254 A | 11/1993 | Orthey |
| 5,297,343 A * | 3/1994 | Melter .................. B26B 29/04 30/143 |
| 5,323,502 A | 6/1994 | Miller |
| 5,377,412 A | 1/1995 | Schofield et al. |
| 5,987,755 A | 11/1999 | Shih |
| 6,029,297 A | 2/2000 | French |
| D421,376 S | 3/2000 | Neff |
| 6,301,787 B2 | 10/2001 | Mock |
| 6,336,272 B1 * | 1/2002 | Lee .................. B26B 13/16 30/261 |
| 6,588,039 B1 | 7/2003 | Bates |
| 6,618,885 B1 | 9/2003 | Blaustein |
| 6,619,158 B2 | 9/2003 | Bates et al. |
| D485,146 S | 1/2004 | Rivera |
| 6,687,991 B2 | 2/2004 | Murg |
| 6,691,403 B1 | 2/2004 | Murg |
| 6,739,217 B2 | 5/2004 | Hartranft |
| D494,032 S | 8/2004 | Rivera |
| 6,772,520 B1 | 8/2004 | Shih |
| 7,055,414 B2 | 6/2006 | Konen |
| 7,089,619 B2 | 8/2006 | Smith |
| 7,100,481 B2 | 9/2006 | Hartranft |
| 7,143,672 B1 | 12/2006 | Di Bitonto |
| 7,171,712 B2 | 2/2007 | Konen |
| 7,409,736 B2 | 8/2008 | Konen |
| 7,827,638 B1 | 11/2010 | Klick |
| 8,109,003 B2 | 2/2012 | Liu |
| 2004/0163495 A1 * | 8/2004 | Konen .................. B25B 7/00 81/9.4 |
| 2007/0144015 A1 | 6/2007 | Peterson et al. |
| 2008/0022533 A1 | 1/2008 | Zeller |
| 2009/0277019 A1 | 11/2009 | Mueller |
| 2011/0167642 A1 | 7/2011 | Steele et al. |

FOREIGN PATENT DOCUMENTS

| | | |
|---|---|---|
| DE | 202004013550 | 12/2004 |
| EP | 0598467 | 5/1994 |
| EP | 2730373 | 5/2014 |
| JP | 10-235032 | 9/1998 |
| JP | 10235032 | 9/1998 |
| TW | 561948 | 11/2003 |
| TW | 200704483 | 2/2007 |
| WO | 2011088100 | 7/2011 |

OTHER PUBLICATIONS

International Search Report and Written Opinion for Application No. PCT/US2011/020961 dated Sep. 20, 2011 (11 pages).

Australian Patent Examination Report No. 1 for Application No. 2011205382 dated Oct. 22, 2013 (3 pages).

Canadian Intellectual Property Office Action for Application No. 2,786,753 dated Nov. 18, 2013 (2 pages).

European Examination Report for Application No. 11733302.1 dated Dec. 16, 2015 (5 pages).

Taiwan Patent Office Action for Application No. 102140951 dated Feb. 13, 2015 (12 pages, English translation included).

European Search Report for Application No. 13192244.5 dated Mar. 30, 2016 (8 pages).

* cited by examiner

PLIERS HAVING A SLIDING LOCK BUTTON

CROSS-REFERENCE TO RELATED APPLICATIONS

The present application is a continuation-in-part of and claims priority to co-pending U.S. patent application Ser. No. 13/005,342, filed Jan. 12, 2011, which claims priority to U.S. Provisional Patent Application No. 61/294,290, filed Jan. 12, 2010, and claims priority to U.S. Provisional Patent Application No. 61/724,554, filed Nov. 9, 2012, the entire contents of all of which are hereby incorporated by reference.

FIELD

The present invention relates to hand tools and, in particular, to pliers that include a wire stripper and a sliding lock.

SUMMARY

Pliers, especially an electrician's pliers may include such features as a wire stripper and wire cutter. When not in use, it may be desirable to lock the handles of the pliers together. When ready for use, it may be desirable to unlock the handles with one hand.

In one independent embodiment, a hand tool has a first jaw assembly and a second jaw assembly. The first jaw assembly includes a first handle portion, a first jaw portion, a first pivot portion disposed between the first handle portion and the first jaw portion, and a first rail disposed on one of the first pivot portion and the first handle portion. The second jaw assembly includes a second handle portion, a second jaw portion, a second pivot portion disposed between the second handle portion and the second jaw portion, and a second rail disposed on one of the second pivot portion and the second handle portion. The second rail is shorter than the first rail. A pivot member rotatably couples the first pivot portion to the second pivot portion such that the first jaw assembly and the second jaw assembly pivot with respect to each other between at least an open position and a closed position. A lock button is slidingly coupled to the first rail and selectively slidingly coupled to the second rail when the first jaw assembly and second jaw assembly are in the closed position. A resilient member is disposed between the lock button and the first rail to inhibit sliding movement of the lock button.

In another independent embodiment, pliers include a first jaw, a first handle extending from the first jaw, and a first rail extending from the first handle. The first rail includes a jaw end and a handle end. A second jaw is coupled in pivoting relation to the first jaw between at least an open position and a closed position, the first jaw and the second jaw defining a nose of the pliers. A second handle extends from the second jaw, and a second rail extends from the second handle. The second rail is substantially parallel to the first rail when the second jaw is in the closed position, and the second rail is shorter than the first rail. A lock button is slidingly coupled to the first rail and selectively coupled to the second rail when the second handle is in the closed position, and the first handle fixedly coupled to the second handle when the lock button is coupled to the second rail. A resilient member is disposed between the first rail and the lock button, whereby the resilient member inhibits sliding movement of the lock button.

In yet another independent embodiment, a hand tool may generally include a first jaw assembly including a first handle portion, a first jaw portion and a first rail; a second jaw assembly including a second handle portion, a second jaw portion, and a second rail, the second rail being shorter than the first rail; a pivot member coupling the first jaw assembly and the second jaw assembly for pivoting movement between an open position and a closed position; and a lock button assembly operable between a locked position, in which the lock button assembly engages the first rail and the second rail to releasably hold the first jaw assembly and the second jaw assembly in the closed position, and an unlocked position, in which the lock button assembly is disengaged from the second rail. The lock button assembly may include a first lock button member defining a second rail groove operable to selectively receive the second rail, and a second lock button member separate from and connectable to the first lock button member, the first lock button member and the second lock button member, when connected, cooperating to define a first rail groove receiving the first rail.

In a further independent embodiment, pliers may generally include a first jaw assembly including a first handle portion, a first jaw portion, and a first rail; a second jaw assembly including a second handle portion, a second jaw portion, and a second rail, the second rail being shorter than the first rail; a pivot member coupling the first jaw assembly and the second jaw assembly for pivoting movement between an open position and a closed position; and a lock button assembly operable between a locked position, in which the lock button assembly engages the first rail and the second rail to releasably hold the first jaw assembly and the second jaw assembly in the closed position, and an unlocked position, in which the lock button assembly is disengaged from the second rail. The lock button assembly may include a first lock button member defining a second rail groove operable to selectively receive the second rail, and a second lock button member separate from and connectable to the first lock button member, the first lock button member and the second lock button member, when connected, cooperating to define a first rail groove receiving the first rail.

In another independent embodiment, a lock button assembly for a hand tool may be provided. The hand tool includes a first jaw assembly including a first handle portion, a first jaw portion, and a first rail, a second jaw assembly including a second handle portion, a second jaw portion, and a second rail, the second rail being shorter than the first rail, a pivot member coupling the first jaw assembly and the second jaw assembly for pivoting movement between an open position and a closed position. The lock button assembly may generally include a first lock button member defining a second rail groove operable to selectively receive the second rail; and a second lock button member separate from and connectable to the first lock button member, the first lock button member and the second lock button member, when connected, cooperating to define a first rail groove receiving the first rail. When supported on the first rail, the lock button assembly is operable between a locked position, in which the lock button assembly engages the first rail and the second rail to releasably hold the first jaw assembly and the second jaw assembly in the closed position, and an unlocked position, in which the lock button assembly is disengaged from the second rail.

Other independent aspects of the invention will become apparent by consideration of the detailed description, claims and accompanying drawings.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways.

DETAILED DESCRIPTION

Figure 1:
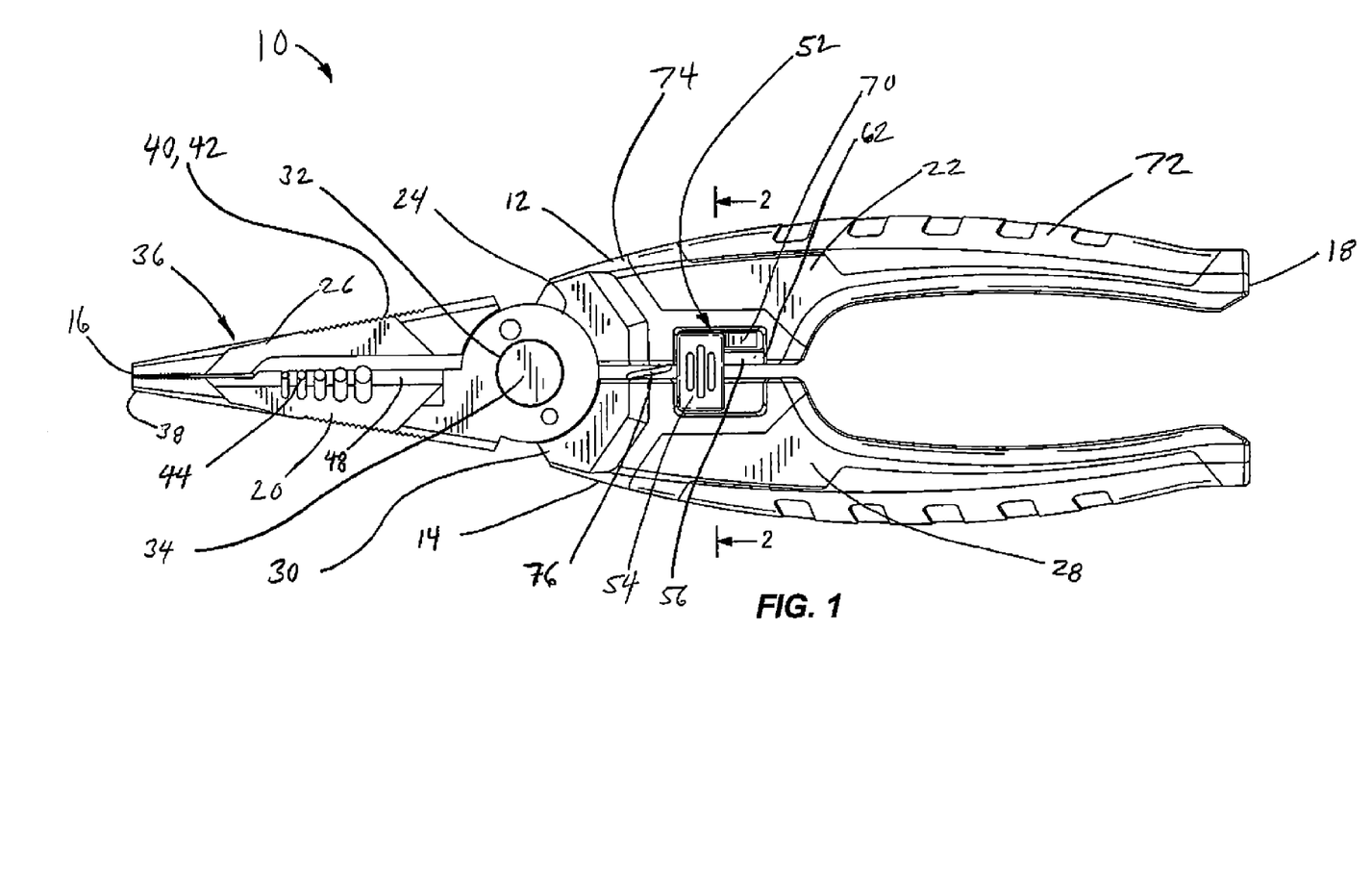
FIG. 1 is a side view of electrician's pliers according to one independent embodiment of the invention.

FIG. 1 illustrates pliers 10 according to one embodiment of the invention, and in particular, the illustrated pliers 10 are electrician's pliers. The pliers 10 include a first member 12, or jaw assembly, and a second member 14, or jaw assembly. Each member 12, 14 has a jaw end 16 and a handle end 18. The first member 12 includes a first jaw portion 20, a first handle portion 22 and a first pivot portion 24 disposed between the first jaw portion 20 and the first handle portion 22. The second jaw assembly 14 includes second jaw portion 26, a second handle portion 28, and a second pivot portion 30 disposed between the second jaw 26 portion and the second handle portion 28. The first pivot portion 24 and second pivot portion 30 each define a pivot aperture 32. The first member 12 is pivotally coupled to the second member 14 about a pivot pin 34 disposed within the pivot apertures 32.

The first jaw portion 20 and second jaw portion 26 together define a nose 36 of the pliers 10. Each jaw portion 20, 26 tapers to a narrow point 38, and, therefore, the pliers 10 may be described as "needle-nose" pliers. Each of the jaw portions 20, 26 includes a plurality of ribs or ridges 40 that create a textured area 42 at the nose 36 of the pliers.

Figure 3:
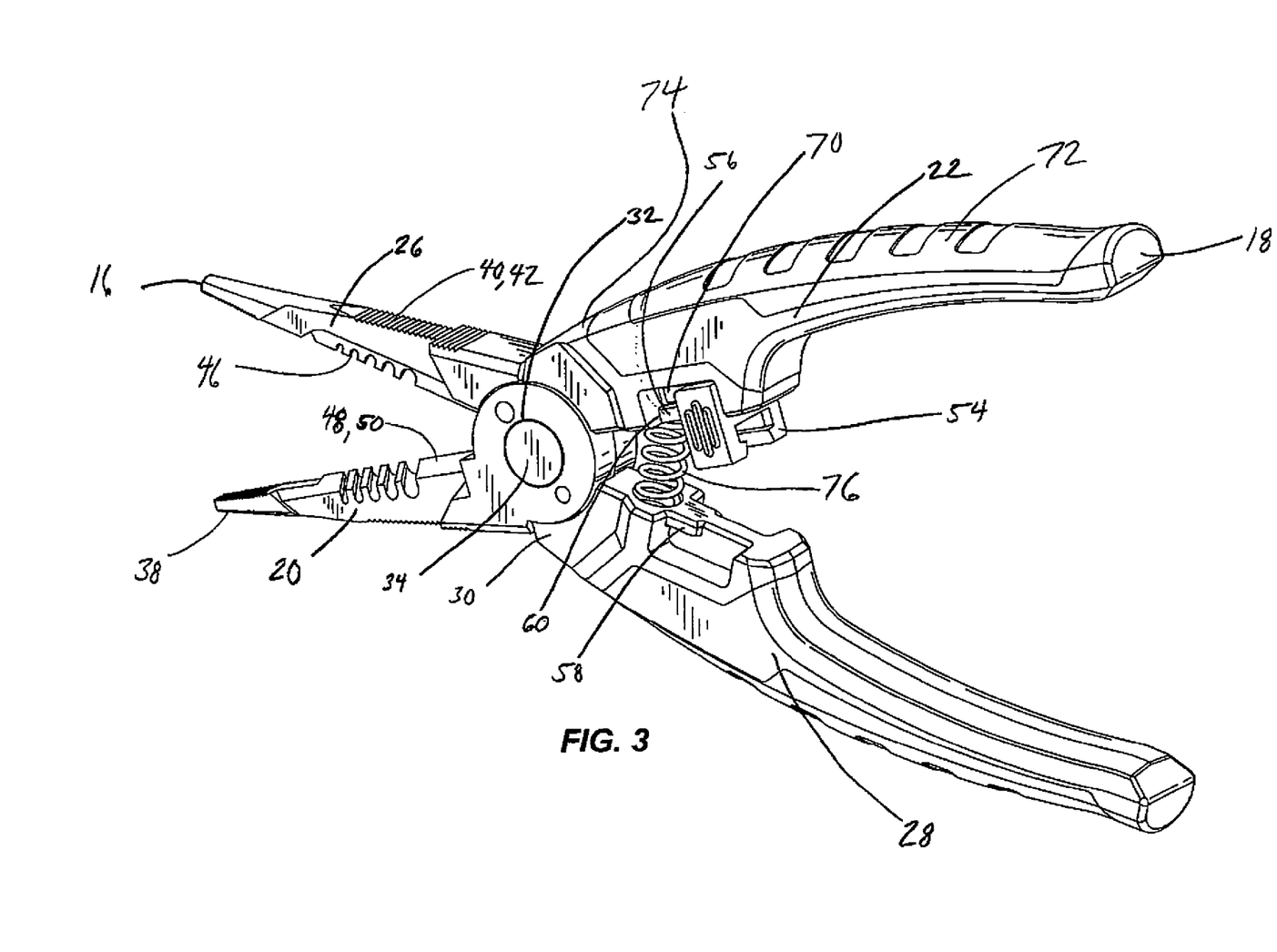
FIG. 3 is a perspective view of the electrician's pliers of FIG. 1, illustrated in an unlocked and open state.

As shown in FIG. 1, apertures 44 extend through the nose of the pliers 10. With reference to FIG. 3, a half 46 of each aperture 44 is formed in each of the jaw portions 20, 26. The apertures 44 are used to strip insulation from a wire, without substantial penetration of the underlying wire core. Each aperture 44 has a different diameter so that each aperture may be used to strip a different size wire.

In addition to the apertures 44 for wire-stripping, the first jaw portion 20 and second jaw portion 26 each include a beveled edge 48. The beveled edges 48 act in conjunction to define a cutter 50 for wire or the like.

Figure 2:
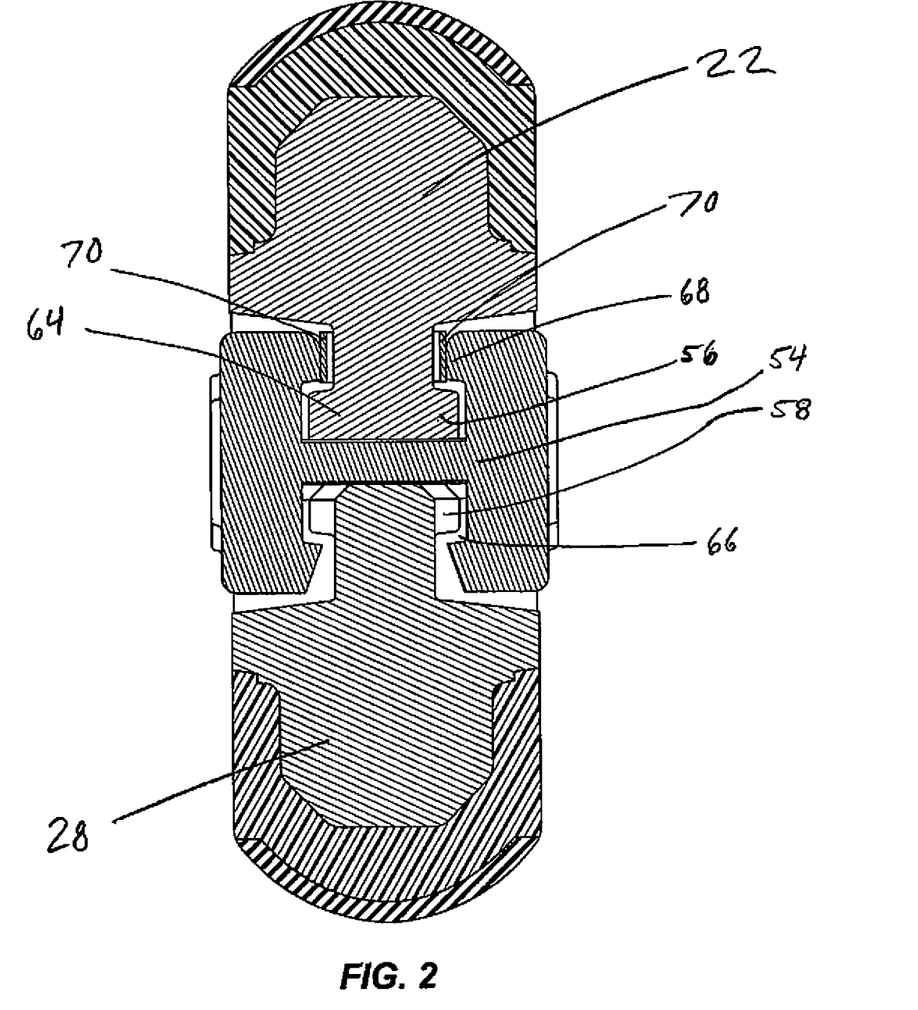
FIG. 2 is a cross-sectional view taken along section line 2-2 of FIG. 1

Referring to FIGS. 1-3, the pliers 10 include a lock assembly 52. The lock assembly 52 includes a locking button 54 slidably coupled to a first guide rail 56 on the first handle portion 22. The locking button 54 is selectively, slidably coupled to a second guide rail 58 on the second handle portion 28. The first guide rail 56 has a jaw end 60 (FIG. 3) and a handle end 62 (FIG. 1). As shown in FIG. 2, the first guide rail 56 and second guide rail 58 each have a T-shaped cross-section 64. The second guide rail 58 is shorter than the first guide rail 56. When the pliers 10 is closed, as illustrated in FIGS. 1 and 2, the first guide rail 56 and second guide rail 58 are substantially parallel.

As shown in FIG. 2, the locking button 54 defines a pair of opposed, T-shaped slots 66. Each T-shaped slot 66 corresponds generally to the cross-section 64 of the first guide rail 56 and second guide rail 58. Each slot 66 includes a pair of retaining flanges 68 for coupling the locking member 54 to the respective guide rail 56, 58.

With the members 12, 14 in a closed position, as illustrated in FIG. 1, the locking button 54 is positioned toward the jaw end 60 of the first guide rail 56, thereby engaging the second guide rail 58 and locking the pliers 10 closed. To unlock the pliers 10, the locking button 54 is slid toward the handle end 62 of the first guide rail 56. As shown in FIG. 3, with the locking button 54 at the handle end 62 of the first guide rail 56, the locking button 54 is no longer engaged to the second guide rail 58 and the members 12, 14 are separated to the illustrated open position.

As best shown in FIG. 2, a pair of resilient members 70 is disposed between the first guide rail 56 and the locking button 54. In the illustrated embodiment, each resilient member 70 is an elongated, rectangular member disposed substantially parallel to the first guide rail 56, and in particular, a leaf spring. In further embodiments, the resilient members 70 may be formed of plastic, rubber, or other non-metallic resilient materials. The resilient members 70 apply tension between the first guide rail 56 and the locking button 54, which inhibits the locking button 54 from sliding into engagement with the second guide rail 58 while in use. In some embodiments, the resilient members 70 bias the locking button 54 toward at least one of the jaw end 60 and the handle end 62 of the first guide rail 56. More particularly, the resilient member 70 biases the locking button 54 away an intermediate position, between the jaw end 60 and the handle end 62 of the first guide rail 56. Thus, the resilient member 70 inhibits the locking button 54 from unintentionally engaging or disengaging the second guide rail 58.

In the illustrated embodiment, the jaw portions 20, 26, handle portions 22, 28, and pivot portions 24, 30 of the each member 12, 14 are formed as one piece from a metal such as an alloy steel. The handle portions 22, 28 are both covered with a rubber over-mold 72. The over-molds 72 provide extra durability, increase user comfort, and reduce slippage of the user's hand on the pliers 10. The over-mold 72 is substantially flush with exposed metal portions 74 of the handle portions 22, 28, which helps prevent the over-molds 72 from getting caught on a tool pouch, shirt pocket, or other objects.

Referring to FIGS. 1 and 3, the pliers 10 include a handle biasing member 76 disposed between the first handle portion 22 and the second handle portion 28. The illustrated handle biasing member 76 is a coil spring, though in other embodiments a leaf spring may be used. The biasing member 76 causes the pliers 10 to pivot to an open position when the handles are unlocked, thus aiding one-handed use of the pliers 10.

Figures 4, 5:
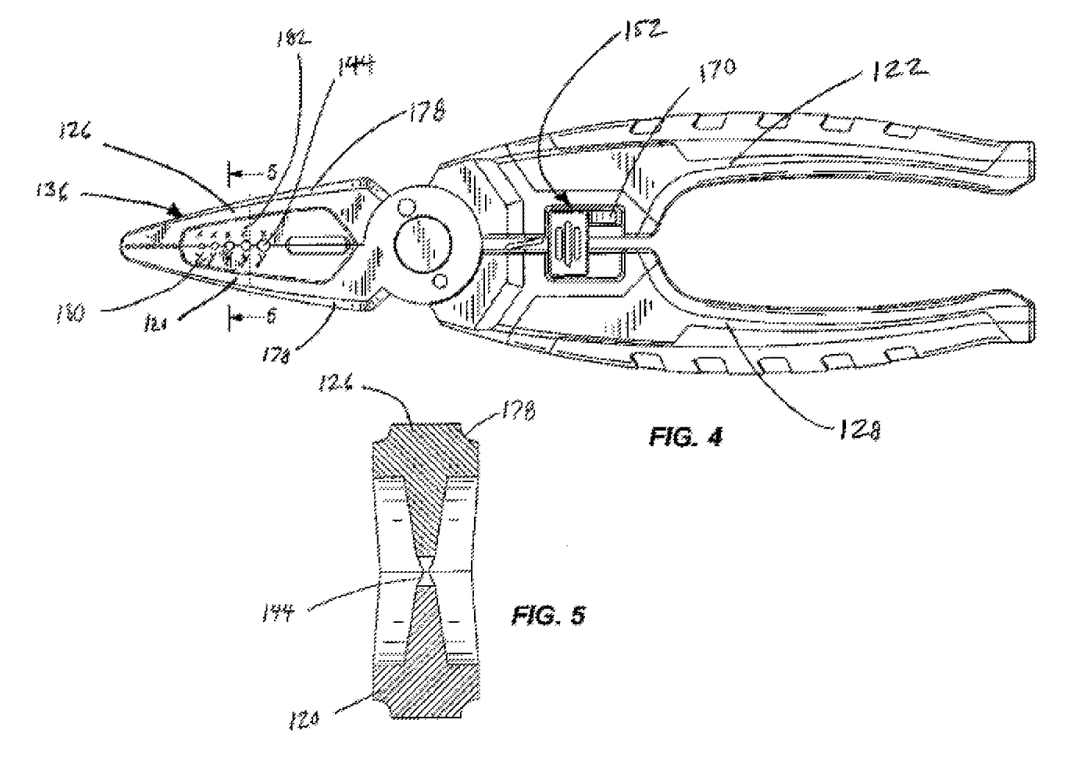
FIG. 4 is a side view of electrician's pliers according to another independent embodiment of the invention.
FIG. 5 is a cross section of the electrician's pliers of FIG. 4, taken along section line 5-5.

FIGS. 4 and 5 illustrate pliers 110 according to another independent embodiment of the invention. Similar features to those illustrated in the embodiment of FIGS. 1-3 have been given similar reference numerals, with a prefix beginning with the numeral "1." The handle portions 122, 128 and the lock assembly 152 of the pliers 110 are substantially identical to those of FIGS. 1-3.

Referring to FIGS. 4 and 5, the pliers 110 includes semi-circular or curved grooved edges 178 on the jaw portions 120, 126. The grooved edges 178 allow the user to use the pliers 110 to ream a pipe to remove burrs or otherwise smooth the inside of a pipe wall along a cut of the pipe. To use the pliers 110 as a reamer, the user inserts the nose of the pliers 110 into a pipe or the like, until the pipe wall contacts the grooved edges 178 and the user rotates the pipe or pliers so that the edges 178 remove burrs and smooth the pipe wall along the cut.

Also illustrated in FIG. 4, a first set of indicia 180 and a second set of indicia 182 are located next to the apertures 144. The first set of indicia 180 correspond to standard American Wire Gauge (AWG) sizes and the second set of indicia 182 correspond to standard International Standard Wire sizes so that the user knows which aperture to use to strip a particular size wire.

Accordingly, the pliers 10 and 110 may include several accessory features, such as wire strippers, a wire cutter, and a pipe reamer. In other embodiments, the pliers may include various combinations of these features. Also, while the illustrated pliers 10 is a needle nose pliers, in other embodiments, other types of pliers can include the accessory features described herein.

Figure 6:
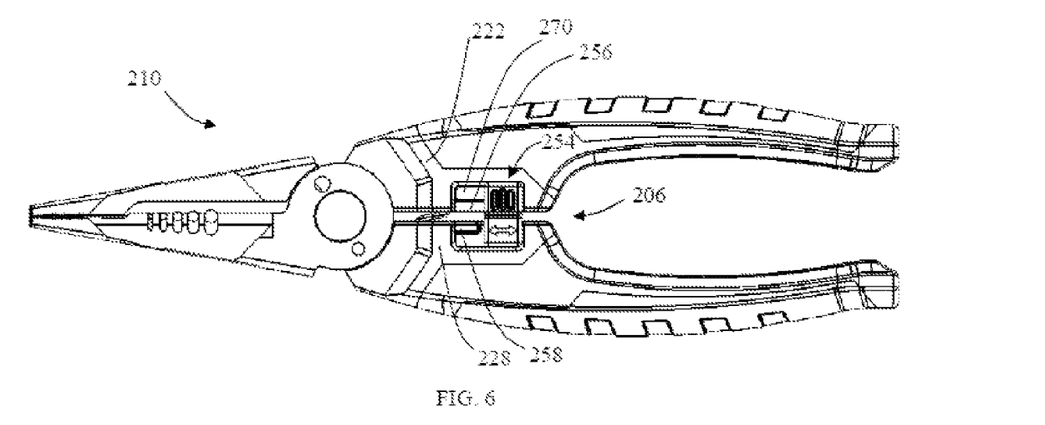
FIG. 6 is a side view of electrician's pliers according to another independent embodiment of the invention.

FIG. 6 illustrates pliers 210 according to another independent embodiment of the invention, and, in particular, the illustrated pliers 210 are electrician's pliers. The pliers 210 includes features similar to the above mentioned pliers 10, including a first handle portion 222 and a second handle portion 228, and only those features of pliers 210 that differ from pliers 10 are discussed in detail below. The pliers 210 include a lock assembly 206. The lock assembly 206 includes a locking button assembly 254 slidably coupled to a first guide rail 256 on the first handle portion 222. The locking button assembly 254 is selectively, slidably coupled to a second guide rail 258 on the second handle portion 228. The first and second guide rail 256, 258 each have a T-shaped cross-section, and the locking button assembly 254 defines a pair of opposed, T-shaped slots as in the previous embodiment. The locking button assembly 254 performs a similar task and is operated the same way as the locking button 54 of the previous embodiment, but the locking button assembly 254 is of a different construction as described below.

Figure 7:
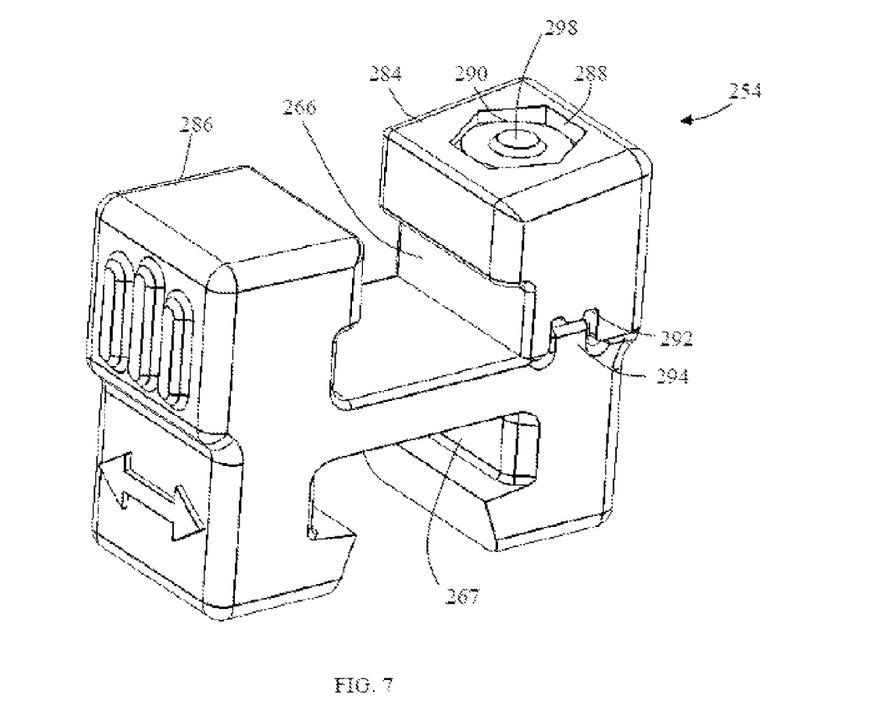
FIG. 7 is a perspective view of a locking button assembly of the electrician's pliers of FIG. 6.
Figure 8:
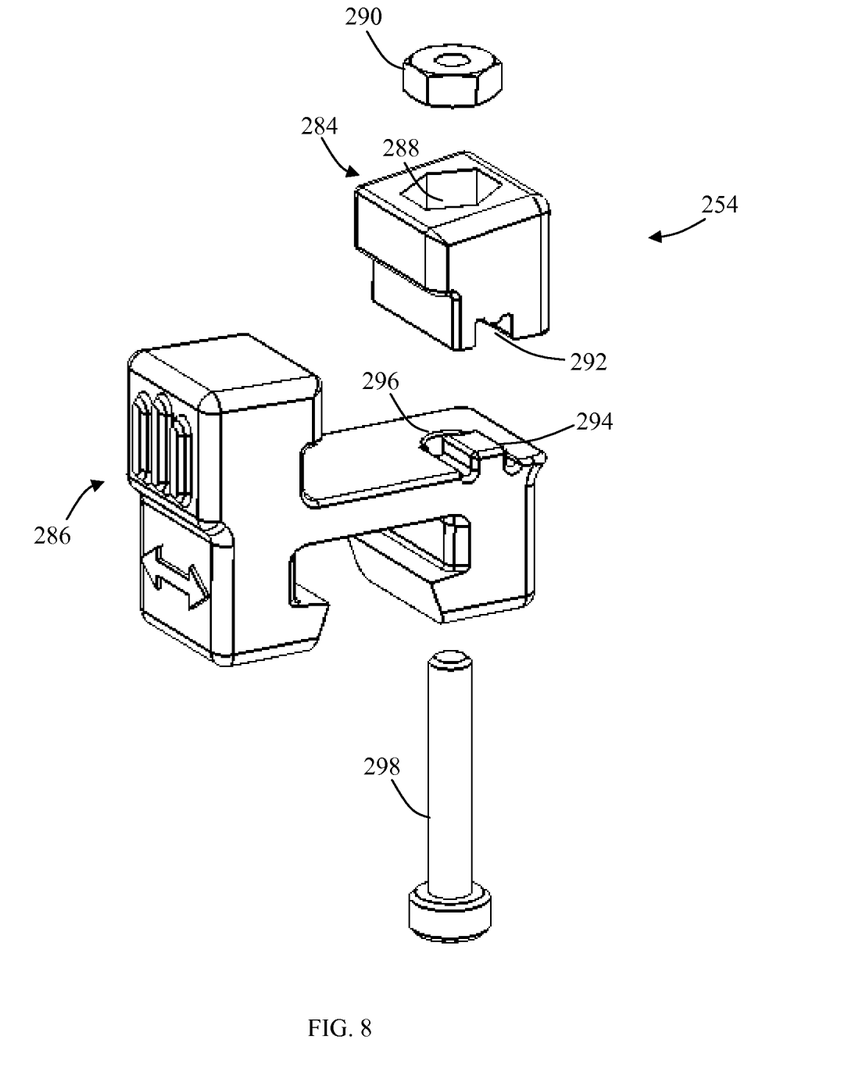
FIG. 8 is an exploded view of the locking button assembly of FIG. 7.

With reference to FIGS. 7 and 8, the locking button assembly 254 includes a first locking button member 286 that couples to a first half of the first guide rail 256 on the first handle portion 222 and the entire second guide second guide rail 258 on the second handle portion 228. The first locking button member 286 includes a protrusion, or rail, 294 and an aperture 296. The locking button assembly 254 includes a second locking button member 284 that couples to a second half of the first guide rail 256. The second locking button member 284 includes an aperture (not shown), a recess 288, and a slot 292. The first and second locking button members 286, 284 are preferably made from a metal, for instance Zinc, using methods such as die cast, metal injection molding, or powder metallurgy. The metal construction of the first and second locking button members 286, 284 provides improved locking strength of the locking assembly 206, however, the rigid construction of the locking button assembly 254 changes the assembly process.

The first and second locking buttons members 286, 284 are coupled together with a fastener 298 that is inserted in the aperture 296 of the first locking button member 286 and is disposed through both of the apertures 296 of the first and second locking button members 286, 284. The fastener 298 includes a nut 290 that sets into the recess 288 of the second locking button member 284. Relative rotation between the first and second locking members 286, 284 is prevented by the rail 294 of the first locking button member 286 received by the slot 292 of the second locking button member 284. However, the mating rail 294 and slot 292 connection can be interchanged such that the rail 294 is part of the second locking button member 284 and the slot 292 is part of the first locking button member 286. Although illustrated as such, the first locking button member 286 can couple half of the second guide rail 258 and the entire first guide rail 256, with the second locking button member 284 coupled to the other half of the second guide rail 258.

Although the invention has been described in detail with reference to certain preferred embodiments, variations and modifications exist within the scope and spirit of one or more independent aspects of the invention as described.

We claim:

1. A hand tool comprising:
a first jaw assembly including a first handle portion, a first jaw portion and a first rail;
a second jaw assembly including a second handle portion, a second jaw portion, and a second rail, the second rail being shorter than the first rail;
a pivot member coupling the first jaw assembly and the second jaw assembly for pivoting movement between an open position and a closed position; and
a lock button assembly operable between a locked position, in which the lock button assembly engages the first rail and the second rail to releasably hold the first jaw assembly and the second jaw assembly in the closed position, and an unlocked position, in which the lock button assembly is disengaged from the second rail, the lock button assembly including
a first lock button member defining a second rail groove operable to selectively receive the second rail, and
a second lock button member separate from and connectable to the first lock button member, the first lock button member and the second lock button member, when connected, cooperating to define a first rail groove receiving the first rail.

2. The hand tool of claim 1, wherein one of the first lock button member and the second lock button member has a protrusion, and the other of the first lock button member and the second lock button member defines a mating groove operable to receive the protrusion to inhibit relative rotational movement between the first lock button member and the second lock button member.

3. The hand tool of claim 1, wherein at least one of the first lock button member and the second lock button member defines an opening, and wherein the lock button assembly further includes a fastener receivable in the opening to connect the first lock button member to the second lock button member.

4. The hand tool of claim 3, wherein the lock button assembly further includes a nut operable to be secured on the fastener.

5. The hand tool of claim 4, wherein a portion of the opening is defined in hexagonal shape complementary to the nut.

6. The hand tool of claim 1, wherein the first rail has a T-shaped cross section, and wherein the first lock button member and the second lock button member cooperate to define a T-shaped slot for receiving the first rail.

7. The hand tool of claim 1, wherein the first lock button member and the second lock button member are translationally moved along the first rail between the locked position and the unlocked position.

8. The hand tool of claim 1, wherein the hand tool includes pliers.

9. Pliers comprising:
a first jaw assembly including a first handle portion, a first jaw portion, and a first rail;

a second jaw assembly including a second handle portion, a second jaw portion, and a second rail, the second rail being shorter than the first rail;

a pivot member coupling the first jaw assembly and the second jaw assembly for pivoting movement between an open position and a closed position; and a lock button assembly operable between a locked position, in which the lock button assembly engages the first rail and the second rail to releasably hold the first jaw assembly and the second jaw assembly in the closed position, and an unlocked position, in which the lock button assembly is disengaged from the second rail, the lock button assembly including a first lock button member defining a second rail groove operable to selectively receive the second rail, and a second lock button member separate from and connectable to the first lock button member, the first lock button member and the second lock button member, when connected, cooperating to define a first rail groove receiving the first rail.

10. The pliers of claim 9, wherein one of the first lock button member and the second lock button member has a protrusion, and the other of the first lock button member and the second lock button member defines a mating groove operable to receive the protrusion to inhibit relative rotational movement between the first lock button member and the second lock button member.

11. The pliers of claim 10, wherein at least one of the first lock button member and the second lock button member defines an opening, and wherein the lock button assembly further includes a fastener receivable in the opening to connect the first lock button member to the second lock button member.

12. The pliers of claim 11, wherein the lock button assembly further includes a nut operable to be secured on the fastener.

13. The pliers of claim 12, wherein a portion of the opening is defined in hexagonal shape complementary to the nut.

14. The pliers of claim 9, wherein the first rail has a T-shaped cross section, and wherein the first lock button member and the second lock button member cooperate to define a T-shaped slot for receiving the first rail.

15. The pliers of claim 14, wherein the first lock button member and the second lock button member are translationally moved along the first rail between the locked position and the unlocked position.

16. A lock button assembly for a hand tool, the hand tool including a first jaw assembly including a first handle portion, a first jaw portion, and a first rail, a second jaw assembly including a second handle portion, a second jaw portion, and a second rail, the second rail being shorter than the first rail, a pivot member coupling the first jaw assembly and the second jaw assembly for pivoting movement between an open position and a closed position, the lock button assembly comprising:

a first lock button member defining a second rail groove operable to selectively receive the second rail; and a second lock button member separate from and connectable to the first lock button member, the first lock button member and the second lock button member, when connected, cooperating to define a first rail groove receiving the first rail;

wherein, when supported on the first rail, the lock button assembly is operable between a locked position, in which the lock button assembly engages the first rail and the second rail to releasably hold the first jaw assembly and the second jaw assembly in the closed position, and an unlocked position, in which the lock button assembly is disengaged from the second rail.

17. The lock button assembly of claim 16, wherein one of the first lock button member and the second lock button member has a protrusion, and the other of the first lock button member and the second lock button member defines a mating groove operable to receive the protrusion to inhibit relative rotational movement between the first lock button member and the second lock button member.

18. The lock button assembly of claim 17, wherein at least one of the first lock button member and the second lock button member defines an opening, and wherein the lock button assembly further comprises a fastener receivable in the opening to connect the first lock button member to the second lock button member.

19. The lock button assembly of claim 18, further comprising a nut operable to be secured on the fastener.

20. The lock button assembly of claim 19, wherein a portion of the opening is defined in hexagonal shape complementary to the nut.

* * * * *